R. P. GORDON.
Potable-Engine.
No. 219,250. Patented Sept. 2, 1879.
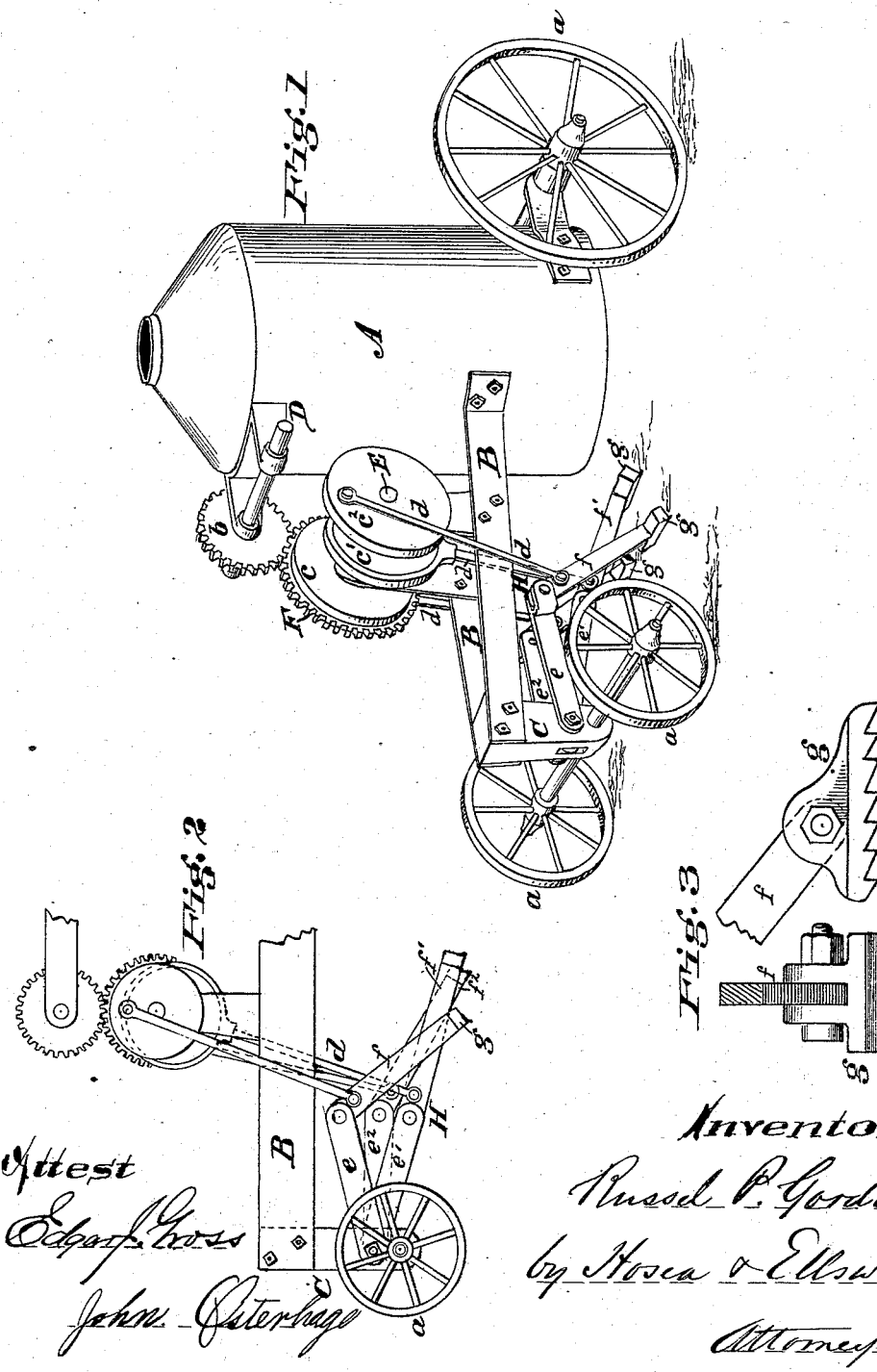

UNITED STATES PATENT OFFICE.

RUSSEL P. GORDON, OF MARTINSBURG, OHIO.

IMPROVEMENT IN PORTABLE ENGINES.

Specification forming part of Letters Patent No. 219,250, dated September 2, 1879; application filed February 24, 1879.

*To all whom it may concern:*

Be it known that I, RUSSEL P. GORDON, of Martinsburg, Knox county, Ohio, have invented a new and useful Improvement in Portable or Farm Engines, of which the following is a full and exact description, reference being had to the accompanying drawings, in which—

Figure 1 represents, in perspective view, a portable engine with my engine applied thereto, (the steam-cylinders and connecting parts being omitted for convenience of illustration;) and Fig. 2 is a side elevation of the front portion of the engine-carriage, showing the supplemental shaft and its immediate connections by which propulsion is effected; Fig. 3, a side and end elevation of the foot.

My invention relates to that class of portable engines mounted on wheels and used in driving agricultural and other machinery, in which service it is required to be transported from place to place over ordinary roads, and is intended to furnish a means of utilizing the power of the driving-engine in moving the carriage upon which it is mounted, and in aiding the draft-horses on steep gradients or in soft ground.

My invention consists in a novel arrangement, in a wheeled vehicle, of toggle-jointed propelling-levers, each having one end connected to the support of an axle and the other end provided with a suitable foot for resting upon the ground, and a shaft having cranks or eccentrics, each connected by a rod with one of the toggle-jointed propelling-levers below and near its joint, said shaft being arranged above the said levers, whereby, when said shaft is rotated, the said rods will alternately lift the feet of said levers from the ground and crook the levers, and plant the feet again upon the ground, and bend the joint of the levers toward a straight line, thus driving the vehicle away from the points where the feet of the levers strike the ground.

In the drawings, A denotes the boiler, which in this instance is vertical; B, the side pieces of the frame, uniting the boiler with the front truck; C, the center support of the front axle, connecting the truck with the frame B; and $a$ $a$ $a$, the supporting-wheels upon which the engine is mounted. D is the main driving-shaft, from which the driving mechanism, fly-wheel, &c., are omitted in the drawings for convenience of illustration.

The driving-shaft carries a pinion, $b$, meshing with a pinion, F, upon the supplemental shaft E, and thus communicates its rotary motion to it.

Crank-wheels or eccentrics $c$ $c^1$ $c^2$ upon the supplemental shaft E give a vertical reciprocating motion by means of pitmen or connecting rods $d$ $d$ $d$ to jointed levers H, below, composed of the part $e$ and $f$. These levers are pivoted at one end to the supporting-piece C, while their free ends rest upon the ground, being protected from wear by feet $g$, which may be weighted, if necessary, to hold them down.

The connecting-rods being pivoted to the outer portions $f$ of the levers at a point quite near to the connecting-pivot of the joint, as the joint is drawn up the feet $g$ of the levers are lifted clear of the ground, and when the joint is depressed the feet $g$ impinge upon the ground and cause the carriage to be propelled forward.

The eccentrics or crank-wheels $c$ being so relatively arranged as that their crank-movements follow each other in regular succession, a regular propelling movement is imparted to the carriage.

To facilitate the adherence of the feet $g$ to the ground, they may be separately cast of heavy material and provided with teeth upon the bottom, as shown in Fig. 3.

Having fully described my invention, I claim—

The combination, with the front axle and support C, connected to the boiler A by the side pieces B, of the toggle-jointed levers, each having one end secured to said support and the other end provided with a suitable foot for resting upon the ground, the supplemental shaft E, carrying eccentrics or cranks, and the rods $d$, connecting said eccentrics or cranks with the toggle-joint lever below and near the joints H, substantially as described.

In testimony of which invention I have hereunto set my hand.

RUSSEL P. GORDON.

Witnesses:
R. H. MORGAN,
J. J. SIMPSON.